This invention relates in general to the extraction of boron-containing materials from dilute liquors and more particularly to a liquid-liquid extraction process enabling the recovery of boron values from boron-containing alkaline liquors.

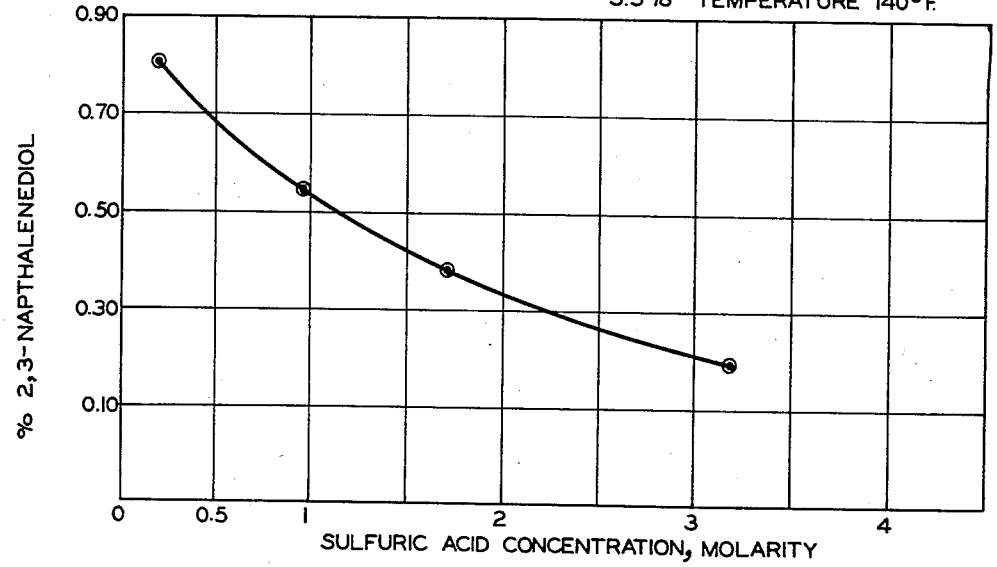
FIG_1 SOLUBILITY OF 2,3-NAPTHALENEDIOL IN SULFURIC ACID-BORIC ACID SOLUTION. BORIC ACID HELD CONSTANT AT 3.5% TEMPERATURE 140°F
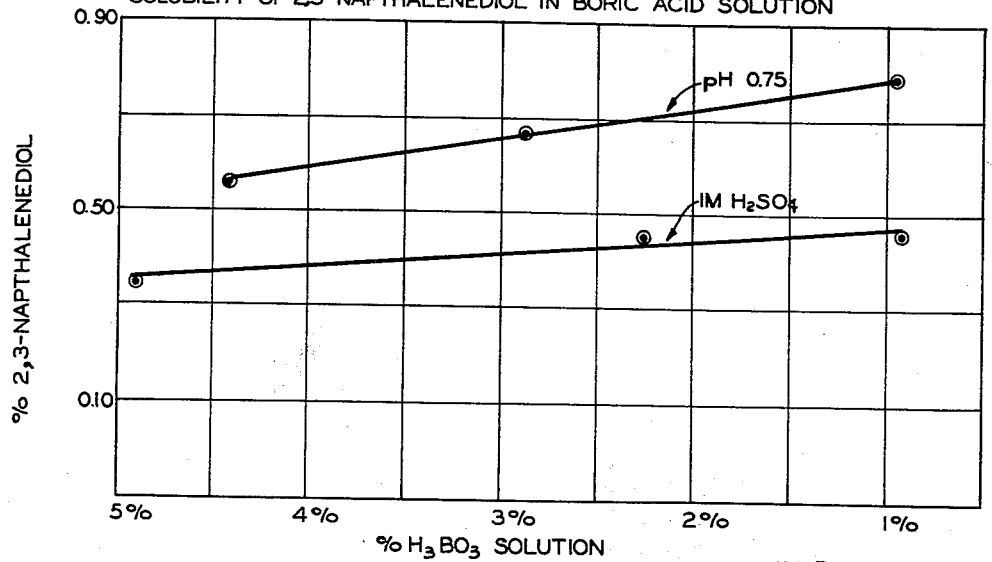
FIG_2 SOLUBILITY OF 2,3-NAPTHALENEDIOL IN BORIC ACID SOLUTION
INVENTORS
DONALD E. GARRETT
FREDRICH J. WECK
ADAM J. MARSH
HERBERT R. FOSTER, JR.
ATTORNEYS 3,111,383
BORON EXTRACTANTS
Donald E. Garrett, Claremont, and Friedrich J. Weck, Trona, Calif., Adam J. Marsh, Niagara Falls, N.Y., and Herbert R. Foster, Jr., Seattle, Wash., assignors to American Potash & Chemical Corporation, a corporation of Delaware
Filed June 21, 1961, Ser. No. 118,519
17 Claims. (Cl. 23—149)

Borax and other boron-containing materials ordinarily are recovered from dilute liquors containing them by evaporation or by cooling the liquor so that the boron salt or boric acid crystallizes out of the solution, but more effective methods are desired.

It is therefore an object of this invention to provide a method for the recovery of boron values in the form of boric acid from alkaline borate solutions, i.e. solutions containing alkaline salts such as sodium borates, potassium borates, or calcium borates, said process being particularly applicable to solutions with borate contents too low for conventional direct crystallization processes.

It is a further object of this invention to provide a method for the recovery of boron from liquors containing alkaline borate salts by a liquid-liquid extraction process which may be utilized in a continuous fashion and in commercial operations.

Other objects and advantages of this invention, if not specifically set forth, will become apparent during the course of the description which follows.

In the drawings:
FIGURES 1 and 2 are graphs showing the solubility of a preferred extractant in various solutions, these graphs being typical of others which can be prepared for various extractants.

Broadly, this invention is in part the result of the discovery that certain aromatic compounds are selective complexing agents for borate ions and may be used to extract boron values from liquors, especially very alkaline liquors, containing borates. These aromatic compounds are those having an —OH group bonded to an aromatic ring or to an alkyl chain bonded directly or through an oxygen atom to an aromatic ring and also having a moiety which is either —OH or —CH(R)OH, where R is hydrogen, alkyl of one to seven carbons or halo-substituted alkyl having one to seven carbons bonded to an adjacent carbon. In addition to the complexing agents just mentioned, it is possible to use as complexing agents compounds having —OH groups in the 1,8 position of a fused ring compound such as naphthalene. The aliphatic chains mentioned above may be bonded to an aromatic grouping at either end thereof. The particular effectiveness of the most satisfactory of these complexing agents (referred to hereinafter as polyols) stems from the fact that it has been found that they have low water solubility, chelate quickly, and are readily stripped of boron values if treated with acid. Also, the capacity of these compounds is high—up to 20% by weight of boric acid equivalent in the organic phase. Finally, they are poor solvents for other common inorganic salts customarily found in alkaline brines. Preferably, they are used with a carrier to provide for the maintenance of a liquid organic system throughout the extraction cycle.

In its simplest embodiment, this invention comprises treating the boron-containing aqueous alkaline liquor with a suitable polyol, allowing a boron-polyol complex to form, separating the complexes from the aqueous liquor, and thereafter breaking the complex so as to separate the boron compound and recover the polyol.

The complex may be an insoluble solid which must thereafter be separated from the aqueous liquor and broken or it may be soluble in the solvent present from which the boron must thereafter be separated.

When incorporated in a boron complex, the extractants with which this invention is concerned produce a strong electron resonance with the boron ion present (see Pauling, The Nature of the Chemical Bond, page 137). The related boron ion present in the alkaline medium from which it is desired to remove such boron thus forms a 5- or 6-membered oxo ring. This complex anion may form complex salts with cations such as sodium and potassium.

As stated, these materials are particularly effective extractants for borates while at the same time they are relatively poor solvents for such salts as potassium chloride, sodium sulfate, sodium carbonate, sodium chloride, sodium phosphate, sodium sulfide, and other inorganic salts commonly found in brines derived from various natural sources. In addition, they have a low affinity for water and either low melting points (below 10–15° C.) or, alternatively, high solubility in certain common organic solvents or even in the alkaline brine in which the boron values are dissolved. Thus, they may be used under conditions which are conveniently attained in commercial operation.

The compounds to which this invention is directed fall into several categories:

(1) Phenylglycols:

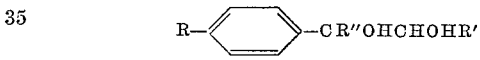

R=hydrogen, halogen or an aliphatic radical of 1 to 15 carbons;
R'=hydrogen or phenyl;
R''=hydrogen or lower alkyl.

(2) Glycerol ethers of aromatics:

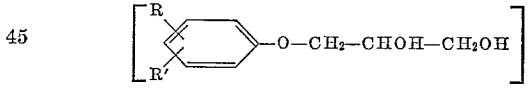

R and R'=hydrogen, halogen, aliphatic radicals of 1 to 10 carbons, or halogen-substituted aliphatic radicals of 1 to 10 carbons.

(3) 1,2-Aromatic diols and 1,8- and 1,10-fused ring aromatic diols, e.g.:

(a)

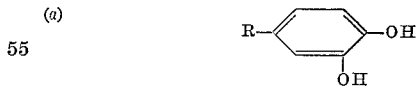

R=aliphatic radical of 1 to 15 carbons or halogen.

(b)

2,3-naphthalenediol (c)

R and R'=aliphatic radicals of 1 to 7 carbons, hydrogen, or halogen.

(d)

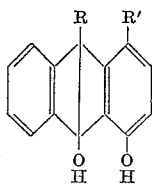

R and R'=aliphatic radicals of 1 to 7 carbons, hydrogen, or halogen.

(4) Methylol phenols and naphthols, e.g.:

(a)

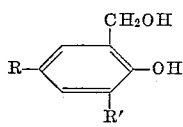

R=aliphatic radical of from 1 to 15 carbon atoms, H, phenyl, or halogen.
R'=aliphatic radical of from 1 to 15 carbon atoms, phenyl, halogen, or $CH_2OH$.

(b)

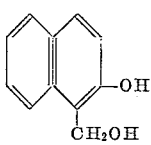

Methylolnaphthol

The following illustrates the effectiveness of several of the extractants of this invention as compared with 1,2-octanediol, a particularly effective aliphatic diol. The extractant was contacted with the boron-containing solution until equilibrium was reached.

| Compound (Typical Representative) | Distribution Coefficient for— | |
|---|---|---|
| | Extraction, $K_1$ | Regeneration, $K_2$ |
| 1. 1,2-octanediol | 12.17 | 2.19 |
| 2. phenyl glycol | 51.8 | |
| 3. 2-chloro-4-(1,1,3,3-tetramethylbutyl)-6-methylolphenol | 80 | 60 |
| 4. 2,3-naphthalenediol | 100 | 80 | where $K_1$, the boron extraction equilibrium, =

$$\left(\frac{\text{Wt. percent B in organic phase}}{\text{Wt. percent B in alk., aqu. ph.}}\right)$$

and where $K_2$, the boron recovery equilibrium, =

$$\left(\frac{\text{Wt. percent B in acid aqu. ph.}}{\text{Wt. percent B in organic phase}}\right)$$

In the practice of this invention, the extractant is contacted with the material containing the boron source (generally a brine) and agitated therein until the crystals of the polyol, if any, disappear. Where such a material as 2,3-naphthalenediol is used, the extractant is first placed in solution in the carrier, e.g. 1-octanol containing 10% tributylphosphate. Where 1-octanol is used as a carrier, a synergistic effect is obtained. In one embodiment of the invention, precipitaton of the boron complex is observed to begin immediately after formation of the solution of the boron-containing liquor and the extractant. In the process variation wherein such a material as 2-chloro-4-(1,1,3,3-tetramethylbutyl)-6-methylol-phenol is used in solution in a suitable water immiscible organic carrier, the complex remains dissolved in the organic phase while the aqueous phase retains the remaining components of the brine solution.

Several methods have been successfully employed for recovering the boron values either from the organic solution or from the precipitated complex. A preferred method where a solid complex forms is to suspend and/or dissolve it in water and acidify, preferably with a dilute mineral acid such as 1 to 5 N $H_2SO_4$. The polyol is released and, if an organic solvent for the polyol is added to serve as a stripping agent (or is present at the outset, as in the form of a carrier for the polyol), the polyol dissolves therein and the mineral acid salts formed, together with the boron values, remain dissolved in the aqueous filtrate.

Where the complex forms and dissolves in the organic solvent, the organic phase may be separated from the aqueous phase and the layer containing brine depleted of boron values may be discarded. The complex is contacted with dilute mineral acid and decomposed, whereupon the boron values and the associated cations from the complex pass into the aqueous phase while the remaining organic extractant solution is recycled in the process and mixed with fresh brine so as to load it once again. The aqueous phase containing boric acid and salts of the mineral acid may be sent to a boric acid recovery station where boric acid is recovered by an evaporation and crystallization cycle. In the case of sulfuric acid, enough water is evaporated to crystallize boric acid at a temperature in the neighborhood of 35° C. The amount of water evaporated is controlled to avoid separation of the sulfates from solution. After removal of the solid boric acid, the solution is heated to a higher temperature and more water is evaporated. Because the solubility of boric acid increases more rapidly with an increase in temperature than do the solubilities of the sulfates, the latter crystallize out and boric acid remains in solution. After removal of the solid sulfates, the solution is recycled to the low temperature evaporator with more aqueous phase from the liquid-liquid extraction process. Such processes are well understood in the art. See, for example, U.S. Patent 1,888,391; U.S. Patent 2,104,009; and U.S. Patent 2,637,626.

It is believed that the alkali ions actually participate in the boron extraction processes of this invention. In the process variant involving precipitation, the alkali ions form a part of the insoluble alkali-boron-polyol complex. In the liquid extraction process, the polyols and borate ions again react to form boron-polyol complex anions which are extracted into the solvent phase along with equivalent amounts of alkali cations. It appears that the complex anions and alkali cations form a neutral molecular complex salt which dissolves in the solvent as a molecular species containing one alkali atom, one boron atom, and either one or two polyol molecules per complex molecule. Evidence indicates that extraction of appreciable amounts of boron complexes containing only one polyol molecule per boron atom may be achieved; however, some extractants require the presence of two or more moles of polyol per mole of boron for adequate boron extraction.

As aforestated, recovery of the boric acid from the boron-polyol complex may be accomplished by treating the complex with dilute mineral acid, with $H_2SO_4$ preferred. Certain polyols are appreciably soluble in both the liquor and the regeneration solution (containing boric acid, sulfuric acid and the sulfate salts) which forms when the preferred mineral acid, $H_2SO_4$, is used. This solubility may be lowered by further stripping with a solvent therefor such as an alcohol (e.g. octanol or decanol) or an ether. Solubility of the polyol in the solution of boric acid, sulfuric acid, and sulfate salts is dependent primarily upon the $H_2SO_4$ concentration, with greater concentrations of $H_2SO_4$ resulting in lesser amounts of polyol being dissolved, as shown in FIGURE 1. The solubility of the polyol in the boric acid solution is dependent upon the amount of boric acid present, as shown in FIGURE 2. Both FIGURES 1 and 2 relate to the extractant 2,3-naphthalenediol, but similar graphs may be prepared readily for other extractants.

Examples are set forth below of the process as carried out on a laboratory scale. These are for illustrative purposes only and are not to be interpreted as imposing limitations on the scope of the invention other than as set forth in the appended claims.

*Example I.*—A quantity of 150 g. of brine containing 1.05% $Na_2B_4O_7$, about 5% KCl, about 5% $Na_2CO_3$, about 6% $Na_2SO_4$, about 0.1–0.15% $Na_2S$ and $Na_3PO_4$, about 0.05% $Na_3AsO_4$ and about 16% NaCl and 5.5 g. of 1,8-naphthalenediol were shaken for one minute until the crystals of the diol disappeared. After another minute, precipitation of the boron complex began and about four minutes later it was complete. The crystals of the complex were filtered under suction. The borax content of the liquor was reduced from 1.05% to 0.30% while the crude, dry filter cake contained 2.28% boron equivalent to 17.44% boric acid. The filter cake was dissolved in water and the solution acidified to precipitate the diol. The boron values remained in the filtrate. In attempting to recrystallize the raw 1,8-naphthalenediol from water, most of it was lost by oxidation. However, when the filtrate was treated with 1 N $H_2SO_4$, a white precipitate formed. Addition of an equal quantity of petroleum ether dissolved the diol and the sulfates and $H_3BO_3$ appeared as solutes in the aqueous solution. Selectivity using this diol is very good, no chloride, carbonate or sulfate being precipitated and up to 93% of the boron in a brine of the type described above being removed with a stoichiometric quantity of the diol and 92% of the boron being removed when only 80% of the stoichiometric requirements of 1,8-naphthalenediol are used.

*Example II.*—7.5 g. of phenyl-glycol carried in 7.5 g. of iso-octanol were contacted with 75 g. of brine. The boron content of the brine calculated as $Na_2B_4O_7$ was reduced from 1.05% to 0.17%. The boron values were recovered by treating the complex formed with dilute $H_2SO_4$. The aqueous phase contained the boron values and was treated to precipitate them as $H_3BO_3$.

*Example III.*—In a continuous mixer settler operation, one part of 2-chloro-4-(1,1,3,3-tetramethylbutyl)-6-methylol-phenol prepared as described hereinafter was dissolved in 3 parts of kerosene and this solution was contacted for a short time (one minute) with an equal amount of a brine containing an equivalent of about 1.05% $Na_2B_4O_7$. The ratio was 800 ml./min. extractant to 500 ml./min. feed liquor. Layers appeared quickly when the liquid was allowed to stand. The analytical data before and after extraction were:

| | Na as $Na_2O$ | K as $K_2O$ | B as $Na_2B_4O_7$ | $SO_4$ | $CO_2$ as $CO_3$ | Cl |
|---|---|---|---|---|---|---|
| Before extraction, percent | 14.31 | 2.18 | 1.05 | 4.16 | 1.71 | 11.57 |
| After extraction, percent | 14.24 | 1.84 | 0.23 | 4.20 | 1.78 | 11.60 |

The organic phase was stripped countercurrently (800 ml./min.) in four stages with dilute sulfuric acid. The collected aqueous phase analyzed as follows:

B as $N_3BO_3$ ---------------------------------- 6.1%
Na as $Na_2SO_4$ -------------------------------- 2.8%
K as $K_2SO_4$ ---------------------------------- 5.2%
$CO_3$ ------------------------------------------ not present
Cl -------------------------------------------- trace
$H_2S$ ------------------------------------------ not present
$H_2SO_4$ --------------------------------------- trace

*Example IV.*—A solution of 4.27 g. of 2,3-naphthalenediol in 25 ml. of octanol was contacted with 100 ml. of brine. The mixture was allowed to separate, and the loaded extractant phase was disentrained by washing with 10 ml. of water.

| | Na as $Na_2O$ | K as $K_2O$ | B as $Na_2B_4O_7$ | $SO_4$ | $CO_2$ as $CO_3$ | Cl |
|---|---|---|---|---|---|---|
| Before extraction, percent | 14.31 | 2.18 | 1.05 | 4.16 | 1.71 | 11.57 |
| After extraction, percent | (¹) | (¹) | 0.13 | 4.17 | 1.80 | 11.58 |

¹ Not determined.

Then the extractant was contacted with 10 ml. of hot 25% $H_2SO_4$ solution to break the complex and to extract a first portion of the boron values. After separation of the aqueous and organic phases, the aqueous phase was cooled to reduce the solubility of the sulfate salts and boric acid dissolved therein. Crystals formed (boric acid and sulfates) and were removed by filtration. The mother liquor (filtrate) was spiked with about 5 drops of concentrated $H_2SO_4$, heated, and used to again extract boron values and sulfate salts from the partially stripped extractant. The phase separation, cooling, and filtration procedures described above were repeated and a second crop of crystals was obtained. Then three 10-ml. portions of hot water were used to leach the last traces of boric acid and sulfates from the extractant. The first portion was cooled and polish-filtered, and then combined with the filtrate from the second crop of crystals. About 2 ml. of concentrated $H_2SO_4$ was added to the combined filtrates and the resulting sulfuric acid solution was used to strip loaded extractant from subsequent cycles. The second and third portions of leach water solution were used as the first and second portions of leach solution in subsequent cycles. The loading and stripping cycles were repeated four times so that a total of five loading and stripping operations were completed. The strip solution which was most rich in boron values had the following analysis:

Percent
B as $H_3BO_3$ ---------------------------------- 18.0
$SO_4$ ------------------------------------------ 17.7
Free acidity as $H_2SO_4$ ------------------------ 10.9
Cl -------------------------------------------- 1.16

In each of Examples II–IV, the liquid extractant solution was loaded by mixing it with the brine. The boron values, accompanied by sodium and potassium, passed from the brine to the organic phase where they formed a complex with the extractant, the complex remaining in solution in the solvent used with the extractant, whether iso-octanol, kerosene, or an octanol-tributylphosphate mixture. Thereafter, the aqueous and organic layers which formed were separated one from the other in the settling tank. The aqueous lower layer consisted of the brine depleted of boron values, and this brine was discarded. The organic upper layer was sent to a stripping section. The stripping of the boron values from the solution by contacting the latter with dilute sulfuric acid, 1 N $H_2SO_4$, followed. The complex was decomposed and the boron values, together with the sodium and potassium, passed into the aqueous phase. The regenerated extractant solution was recycled to the first step, where it was mixed with fresh brine. The aqueous phase, containing the boric acid, sodium sulfate, and potassium sulfate, was sent to a boric acid recovery station where the boric acid was recovered by an evaporation and crystallization cycle. Enough water was evaporated at the lower temperature, 35° C., to crystallize boric acid, but not quite enough to cause sodium and potassium sulfates to separate from the solution. After removal of the solid boric acid, the solution was heated to a higher temperature, about 90–95° C., and more water evaporated. Because the solubility of the boric acid increased more rapidly with increasing temperature than did the solubility of sodium and potassium sulfates, the latter crystallized out and the remaining boric acid stayed in solution as the water was evaporated. After removal of the solids, the solution was recycled to the lower temperature evaporator with more aqueous phase from the liquid-liquid extraction process.

*Example V.*—One volume of 15 weight percent solution of 2-chloro-4-(1,1,3,3-tetramethylbutyl)-6-methylolphenol in kerosene (prepared by a process described infra) was contacted with 0.425 volume of an alkaline, boron-containing brine by shaking for 15 minutes in a separatory funnel. The phases were allowed to separate and, after five minutes, the lower (brine) phase was drawn off and the separated phases were centrifuged to remove entrainment. The brine phase was then analyzed.

|  | Sp. Gr. | Percent Na as $Na_2O$ | Percent K as $K_2O$ | Percent B as $Na_2B_4O_7$ | Percent $SO_4^=$ | Percent $Cl^-$ | Percent Alkalinity as $CO_3^=$ |
|---|---|---|---|---|---|---|---|
| Before extr | 1.24 | 12.72 | 1.71 | 1,335 | 3.80 | 10.66 | 2.08 |
| After extr | 1.22 | | | 1,205 | 0.488 | | |

The clear loaded extractant was contacted with 0.114 volume of 1 N sulfuric acid solution by shaking for 2 minutes in a separatory funnel. The phases were allowed to separate for 15 minutes, and the lower (aqueous) phase was drawn off. The extractant was then stripped again with 0.571 volume of 1 N sulfuric acid solution by again shaking for 2 minutes. The phases were allowed to separate for 25 minutes and the lower (aqueous) phase was collected. A total of 0.05 part of distilled water was used to rinse the stripping separatory funnel stem. This rinse water and the two stripping solutions were combined and centrifuged to remove any entrained extractant, and then analyzed. The combined, centrifuged stripping solution had the following analysis:

|  | Percent |
|---|---|
| B as $H_3BO_3$ | 1.11 |
| Free acidity as $H_2SO_4$ | 0.0048 |
| Na as $Na_2O$ | 0.333 |
| K as $K_2O$ | 0.366 |

Analysis of the centrifuged aqueous solutions showed 27 p.p.m. of 2-chloro-4-(1,1,3,3-tetramethylbutyl)-6-methylol-phenol in the barren brine and 44 p.p.m. in the acid stripping solution.

*Example VI.*—One volume of 15 weight percent solution of 2-chloro-4-nonyl-6-methylol-phenol (prepared as reported infra for the extractant of Example V, but using nonyl phenol as a starting material) was contacted with 0.425 volume of an alkaline, boron-containing brine by shaking for 15 minutes in a separatory funnel. The phases were allowed to separate and, after five minutes, the lower (brine) phase was drawn off and the separated phases were centrifuged to remove entrainments. The brine phase was then analyzed as follows:

|  | Sp. Gr. | Percent Na as $Na_2O$ | Percent K as $K_2O$ | Percent B as $Na_2B_4O_7$ | Percent $SO_4^=$ | Percent $Cl^-$ | Percent Alkalinity as $CO_3^=$ |
|---|---|---|---|---|---|---|---|
| Before extr | 1.24 | 12.72 | 1.71 | 1,335 | 3.80 | 10.66 | 2.08 |
| After extr | 1.22 | 12.32 | 1,205 | 0.349 | | | |

The clear loaded extractant was contacted with 0.114 volume of 1 N sulfuric acid solution by shaking for 2 minutes in a separatory funnel. The phases were allowed to separate for 15 minutes and the lower (aqueous) phase was drawn off. The extractant was then stripped again with 0.571 volume of 0.1 N sulfuric acid solution by again shaking for 2 minutes. The phases were allowed to separate for 25 minutes and the lower (aqueous) phase was collected. A total of 0.05 part of distilled water was used to rinse the stripping separatory funnel stem. This rinse water and the two stripping solutions were combined and centrifuged to remove any entrained extractant and then analyzed. The combined, centrifuged stripping solution had the following analysis:

|  | Percent |
|---|---|
| B as $H_3BO_3$ | 1.13 |
| Free acidity as $H_2SO_4$ | 0.0044 |
| Na as $Na_2O$ | 0.332 |
| K as $K_2O$ | 0.370 |

Analysis of the centrifuged aqueous solutions showed 9 p.p.m. of 2-chloro-4-nonyl-6-methylol-phenol in the barren brine and 12 p.p.m. in the acid stripping solution.

A table appears below contrasting various chelating agents or extractants with the compound 2-chloro-4(1,1,3,3-tetramethylbutyl)-6-methylol-phenol. The relative extraction efficiency is based upon a 20% solution of the crude form of the aforementioned preferred compound (used as a standard solution) with a capacity (defined in Table II) of 30. Thus, the extraction efficiency of the other compounds is expressed in percent of this standard. All products were technical grade solutions, prepared by weighing. The table also shows the apparent stability of the extractant and an estimated solubility of the extractant in water. "Very little solubility" is less than 0.01%, less than 1% solubility was designated "little," about 1% solubility was designated "some," and substantially greater than 1% was designated "quite soluble." Preparation of various of the saligenin compounds, the methylol phenols, is shown in application Serial No. 118,526, filed even date herewith.

TABLE I

*Extractants for Boron*

| Chelating Agent [1] | Solvent Carrier | Extractant Concentration Percent Crude Agent [1] In Carrier | Relative Extractant Efficiency | Stability of Extractant | Corresponding Phenol's Estimated Solubility in Water |
|---|---|---|---|---|---|
| p-chlorophenylglycol<br>Cl—⟨phenyl⟩—CHOH—CH₂OH | Isooctane+Ether | 10 | 18 | Good | Some. |
| p-isopropylphenylglycol<br>CH₃—CH(CH₃)—⟨phenyl⟩—CHOH—CH₂OH | do | 10 | 11 | do | Little. |
| 1,2-diphenylglycol<br>⟨phenyl⟩—CHOH—CHOH—⟨phenyl⟩ | Methyl-iso-butyl Ketone+Tributyl-phosphate. | 5 | 100 | do | Do. |

See footnote at end of table.

TABLE I—Continued

| Chelating Agent [1] | Solvent Carrier | Extractant Concentration Percent Crude Agent [1] In Carrier | Relative Extractant Efficiency | Stability of Extractant | Corresponding Phenol's Estimated Solubility in Water |
|---|---|---|---|---|---|
| α-methyl-α-phenylglycol 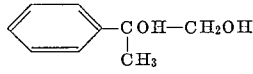 | Decanol | 10 | 10 | Fair | Some. |
| p-isooctylphenyl ether of glycerol 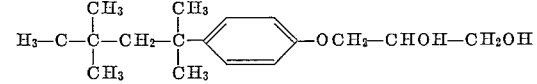 | Kerosene | 20 | 20 | Good | Do. |
| p-chlorophenyl ether of glycerol 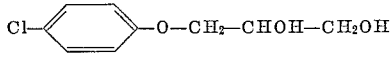 | Decanol | 10 | 10 | do | Quite Sol. |
| 4-tert. butylcatechol 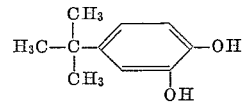 | Octanol | 50 | 100 | Low | Do. |
| methylol-β-naphthol 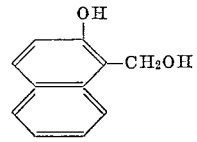 | Decanol | 10 | 50 | do | Little. |
| 2,6-dimethylol-4-octylphenol 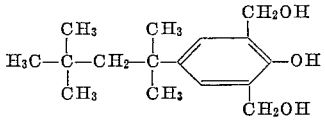 | Kerosene + Decanol 1:1 | 9.5 | 123 | do | Some. |
| 2,6-dimethylol-4-nonylphenol 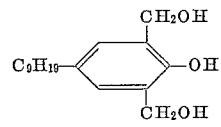 | do | 20 | 161 | do | Do. |
| 2-chloro-4-(1,1,3,3-tetramethyl-butyl)-6-methylol-phenol (4-iso-octyl-6-chloro-saligenin). 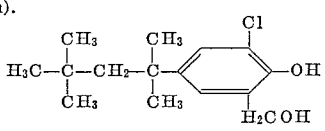 | Kerosene | 20 | 100 | (Good) –fair. | Very Little Solubility. |
| 4,6-dichlorosaligenin 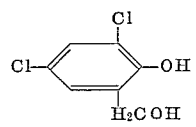 | Benzene-decanol | 10 | 150 | Fair | Quite Sol. |
| 4-tert.-butyl-6-chlorosaligenin (Purity ~90%) 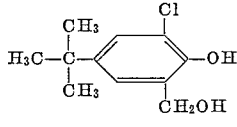 | Benzene | 20 | 128 | | Some. |
| 4-tert.-butyl-6-bromosaligenin (Purity ~50%) 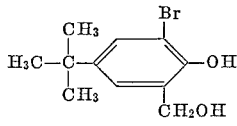 | do | 20 | 24 | | Do. |

See footnote at end of table.

TABLE I—Continued

| Chelating Agent [1] | Solvent Carrier | Extractant Concentration Percent Crude Agent [1] In Carrier | Relative Extractant Efficiency | Stability of Extractant | Corresponding Phenol's Estimated Solubility in Water |
|---|---|---|---|---|---|
| 4-phenyl-6-chlorosaligenin (Purity ~50%) | Kerosene + Benzene + Ether 12:13:8. | (Satur.) 8.3 | 53 | | Little. |
| 4-phenyl-6-bromosaligenin (Purity ~50%) | ...do... | 8.3 | 42 | | Do. |
| 4-isooctyl-6-bromosaligenin (Purity ~50%) | Benzene | 20 | 86 | | Very Little Solubility. |
| 4-nonyl-6-chlorosaligenin (Purity ~90%) | Kerosene | 20 | 68 | | Do. |
| 4-nonyl-6-bromosaligenin (Purity~90%) | ...do... | 20 | 58 | | Do. |
| 4-tert.-butyl-6-methylsaligenin (Purity 90%) | ...do... | 20 | 122 | | |
| 4,6-di(tert. amyl)saligenin (Purity 90%) | ...do... | 20 | 56 | | Do. |
| 4,6-di(sec. amyl)saligenin (Purity<40%) | ...do... | 20 | 41 | | Do. |
| 4,6-di-nonyl-saligenin (Purity~90%) | ...do... | 20 | 53 | | Do. |

See footnote at end of table.

TABLE I—Continued

| Chelating Agent [1] | Solvent Carrier | Extractant Concentration Percent Crude Agent [1] In Carrier | Relative Extractant Efficiency | Stability of Extractant | Corresponding Phenol's Estimated Solubility in Water |
|---|---|---|---|---|---|
| 4-phenyl-2,6-dimethylol phenol<br><br>CH₂OH<br>⌬—⌬—OH<br>CH₂OH | Kerosene + Benzene +Ether. | Start 20<br>End 5 | 86 | | Some. |
| 4-chloro-6-cyclohexylsaligenin (Purity 80%)<br><br>Cl—⌬—OH<br>CH₂OH (with cyclohexyl) | Octanol | 20 | 93 | | Little. |

[1] Chelating agents prepared either without or with only limited product purification.

The process could be employed with a solution containing dissolved boric acid and initially containing little or no alkaline material by treatment of the solution to form an alkaline liquor. The recovery of boric acid from solutions thereof might be necessary in dealing with volcanic waters, scrubbing tower water from high energy fuel test stands, etc. Also, the process might be used to concentrate, purify or recover boric acid in a more convenient form following neutralization, as noted. However, other known processes are far more direct and economical for most applications. The process has been repeated using boron-containing materials other than borax, such as sodium metaborate, potassium tetraborate and potassium metaborate, and has been found to work equally well when any of these other boron-source materials are present.

The extraction coefficients set forth earlier were obtained for aqueous liquors containing about 1.05% $Na_2B_4O_7$ and a variety of other salts, including KCl, $Na_2CO_3$, $Na_2SO_4$, $Na_2S$, $Na_3PO_4$, $Na_3AsO_4$ and NaCl, together with about 65% $H_2O$. Where these various extractants are tested against varying types of liquors containing varying quantities of each of these compounds and, of course, some quantity of boron values, it has been found that only the borate together with alkali metal ions is extracted. Consequently, analysis of the major salts shown in the various tables has been included only to provide examples.

A number of solvents for various polyols have been found suitable. Among these are benzene, isopropyl ether, diethyl ether, tributylphosphate, kerosene, and various alcohols. Monohydric alcohols of from 8 to 17 carbons were investigated and found to be satisfactory. Alcohols with fewer than 8 carbon atoms are appreciably soluble in aqueous solutions and thus are not satisfactory.

A table comparing the results used in various of these carriers wherein the preferred polyol of this invention, 2 - chloro - 4 - (1,1,3,3 - tetramethylbutyl) - 6 - methylolphenol, was used are set forth in Table II below. The stripping figures listed in Example 3 (chlorobenzene) of the table are low since only 8 grams of loaded extractant were stripped instead of the 20 grams listed for the rest of the solvents.

Benzene, ethers such as isopropyl ether and diethyl ether, organophosphates and certain alcohols (especially the long chain alcohols) are effective stripping solvents for the same reasons that they are good solvents at the initial stage of the process. A convenient approach is simply to contact equal volumes of the recently acidified solution and the stripping agent. Recovery of some of the polyols from the stripping agent is accomplished readily by contacting the stripping agent with additional brine. The polyol reacts with the boron in the brine to form a white precipitate which collects at the interface. Since 2-chloro-4-(1,1,3,3-tetramethylbutyl)-6-methylol-phenol is practically insoluble in aqueous phases, solvent extraction therefrom is unnecessary.

TABLE II

*The Effect of Various Solvents Used as Carriers*

| Solvent | B.P.,° C. Flash P.,° C. | Solub. in Water, gm. of Solvent Per 100 cc. H₂O | Extractant Concen., Percent Polyol in Solution | Capacity [1] per 20 gm. of 20% Ext. | Equivalent ml. 0.1 N Boric Acid Obtained After Stripping With— | | | Comments |
|---|---|---|---|---|---|---|---|---|
| | | | | | 5 ml. 1 N H₂SO₄ | 15 ml. 0.1 N H₂SO₄ | 15 ml. 0.1 N H₂SO₄ | |
| Kerosene | 175–325 / 65–85 | Insol. | 20 | 34.60 | 26.41 | 7.02 | 1.17 | Good separation on loading and stripping. |
| Toluene | 110.6 / 6–10 | 0.063 (at 25° C.). | 20 | 34.71 | 27.69 | 62.4 | 0.78 | Very fast separation of organic and aqueous phases on loading and stripping. |
| Chlorobenzene | 131–132 / 28 | 0.0488 (at 30° C.). | 20 | 46.55 | 13.84 | 2.34 | 2.44 | Rather cloudy organic phase on loading. Good separation on stripping. |
| Dihexyl ether | 227 / 77 | Insol. | 20 | 32.36 | 22.42 | 8.48 | 1.46 | Good separation on loading and stripping. |
| Decanol (n-decyl alcohol) | 231 / 82 | Insol. | 20 | 37.73 | Formation of emulsion, only total stripping determined. See "Capacity." | | | Good separation on loading. Formation of heavy emulsion and some "crystals" on stripping. |

[1] "Capacity" is the sum of the boric acid recovered from a fully loaded extractant on exhaustive stripping (here three strippings), expressed in ml. of 0.1 N boric acid, as found by titration with 0.1 N NaOH.

In the various boron stripping processes described earlier, it is necessary to use a dilute mineral acid and while $H_2SO_4$ is preferred because of its low cost, it is possible to use HCl, $HNO_3$, $H_2SO_3$ ($SO_2$), $HClO_4$, or $H_2CO_3$ ($CO_2$).

The preferred extractant of this invention, the compound 2-chloro-4-(1,1,3,3-tetramethylbutyl)-6-methylol-phenol, has been tested with the various acids aforementioned. Results are set forth in Table III below. Throughout these tests, there was used a 20% crude extractant-80% refined kerosene solution with a capacity (cf. Table II) of 27.3.

As has been pointed out above, the solvent used must be capable of forming with the boron ion a 5- or 6-membered oxo ring. The method of counting the atoms incorporated therein is as follows:

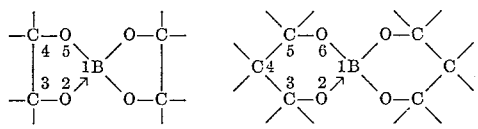

The arrows signify coordinate covalent bonds; that is, bonds in which both of the shared electrons are contributed by one atom. However, all four of the boron bonds are really equivalent and the four equivalent bonds may be thought of as the result of "hybridization" of the boron atomic orbitals.

The data set out earlier show that the "Distribution Coefficient for Extraction" increases as the extent of double bond character in the ring increases. The increased stabilization of the ring in the aromatic systems can be attributed to resonance.

resents a suitable means for storing the compound ultimately needed.

Additionally, the 2-chloro-4-(1,1,3,3-tetramethylbutyl)-6-methylol-phenol-boron complex formed prior to treatment with dilute sulfuric acid in the process of Example III above finds utility as a gasoline additive in the same manner as the organic boron compounds disclosed in U.S. Patent 2,701,548. The borate is added together with tetraethyl lead or tetramethyl lead and a halide scavenging agent, the borate serving to eliminate the adverse effects of the lead deposits which form in gasoline to which tetraethyl lead or tetramethyl lead has been added. The preignition characteristics of the gasoline are thus improved. The boron compound may be added in the amount of between 0.002% and 0.1% boron based upon the gasoline weight. The boron complex incorporating the 2-chloro-4-(1,1,3,3-tetramethylbutyl)-6-methylol-phenol and boron resists hydrolysis to a form in which it is no longer soluble in a gasoline; this is of importance since gasoline is often stored for periods of several months in tanks which may contain quantities of water.

The other complexes described above may be used in the same fashion and are more or less suitable depending upon the resistance to hydrolysis exhibited.

Various extractants falling within each of the four listed categories are well known. For example, various of the phenylglycols of category 1 are described in U.S. Patents 2,804,479 and 2,807,599. The compound 1,2-diphenylglycol (hydrobenzoin) is described by V. Migrdichian in "Organic Syntheses," vol. 1, page 180, Reinhold Publishing Company, New York, 1957. The

TABLE III

*Stripping of Loaded 2-Chloro-4-(1,1,3,3-Tetramethylbutyl)-6-Methylol-Phenol Using Various Acids*

| Stripping Acid | Stripping Ratio Vol. Extractant to Acid | Results of Stripping Using 10 ml. of Indicated Acid and Recording Equivalent ml. of 0.1 N $H_3BO_3$ Stripped | | | Total Stripping as ml of 0.1 N $H_3BO_3$ Per 20 ml. Loaded Extractant | Comments |
|---|---|---|---|---|---|---|
| | | 1st | 2nd | 3rd | | |
| $H_2SO_4$ 1 N | 2/1 | 23.5 | 3.0 | 0.8 | 27.3 | No trouble in either loading or stripping. |
| HCl 1 N | 2/1 | 23.5 | 3.1 | 0.5 | 27.1 | Do. |
| $HNO_3$ 1 N | 2/1 | 24.6 | 2.9 | 0.4 | 27.9 | Do. |
| $HClO_4$ 1 N | 2/1 | 23.2 | 3.3 | 0.6 | 27.1 | Do. |
| $H_3PO_4$ 1 M | 2/1 | 160.0 ml. −89.7 blank | 94.1 −89.7 | (72.0) (−89.7) | 14.7 | Formation of buffer on obtaining a "B" titer. Blank=89.7. |
| $H_2SO_3$ ($SO_2$) | 2/1 | 10.3 | 4.4 | (−7.7) | 26.03 | Indirect method used: stripped 3 times with $H_2SO_3$. 4th stripping done with 1 N $H_2SO_4$ and "B" titer of 4th stripping subtracted from "capacity." Difference="Total Stripping." |
| $H_2CO_3$ ($CO_2$) | 2/1 | 5.4 | 4.1 | 3.1 | 12.6 | Formation of solids on third stripping. |

As indicated, a preferred extractant is the material 2-chloro-4-(1,1,3,3-tetramethylbutyl)-6-methylol-phenol. This material is considerably more resistant to oxidation and decomposition by heat when stored, as may be necessary prior to use, in the form of the complex which is formed during the course of the process described in Example III. Hence, the complex represents a preferred storage method. When the latter is required for use, the complex may be broken readily and the 2-chloro-4-(1,1,3,3-tetramethylbutyl)-6-methylol-phenol released. In comparative tests, the complex was formed and placed in solution in kerosene and held there for one week at 60° C. The 2-chloro-4-(1,1,3,3-tetramethylbutyl)-6-methylol-phenol lost only 2% of its capacity as a boron extractant when the complex formed for storage purposes was broken and the polyol used in the process of this invention. By contrast, when the polyol alone was stored in kerosene at 60° C. for one week, it was found to have lost about 18% of its capacity as a boron extractant. Hence, the complex reppreparation of the glycerol ethers of category 2 is described in general in U.S. Patents 2,731,429 and 2,804,479. Also, methods of preparation of various of these compounds are set out by Gilman and Blatt in "Organic Synthesis," vol. 1, pages 296–8, John Wiley, New York, 1941. The compounds of category 2 are described in British Patent 625,216 (1949).

Various compounds falling within category 3 are articles of commerce, for example, the alkyl-substituted catechol of which a well-known example is isobutyl catechol. Isooctyl catechol is described in U.S. Patent 2,073,316. Various other catechols are readily prepared by the process described in this patent. The 1,8-naphthalenediol of category 3c is prepared according to the method disclosed by Erdmann in Annalen d. Chemie 247 (1888), p. 345, which method involves the alkali fusion of 1-naphthyl-8-sulfonic acid. The compound 2,3-naphthalenediol of category 3b may be prepared according to the process set out in BIOS (British Intelligence Objectives Subcommittee), Report 1152, pp. 23–24 or in FIAT (Field Information Agencies Technical), Report 1313, p. 276.

Various saligenin or methylolnaphthol compounds falling into category 4 are well known and conveniently may be prepared by the methylolation of a phenol or naphthol. See, for example, the method of V. Migrdichian in "Organic Synthesis," op. cit., p. 241, who describes the methylolation of phenols. Phenols, especially the long chain alkyl phenols, may be so treated, various of which, such as octylphenol, nonylphenol, and doceylphenol, are articles of commerce.

The manufacture of 2-chloro-4-(1,1,3,3-tetramethylbutyl)-6-methylol-phenol is as follows:

200 pounds of commercial octyl-phenol, primarily 4-(1,1,3,3-tetramethylbutyl)-phenol, are placed in a 50 gallon glass-lined vessel and melted by heating up to 90° C. Then 75.8 pounds of chlorine gas are introduced from the bottom over a period of 5–6 hours with stirring while the temperature is kept between 80–90° C. (exothermic reaction). The HCl gas produced during the chlorination reaction may be removed by maintaining a slight vacuum on the vessel and scrubbing the off-gases with water.

Thereafter, any residual gases are removed from the reaction mixture by aeration at 30–60° C. over several hours. The resulting chlorinated phenol may be converted without distillation in the same vessel. However, if purification is desirable, it may be distilled either under vacuum or with superheated steam.

To the chlorinated material, 2.33 pounds of sodium hydroxide, dissolved in 19.4 pounds of water, are added while stirring gently. Then, 76 pounds of formaldehyde (37% aqueous solution) are added during a period of 3–4 hours. The reaction mixture should be kept well stirred and a temperature of 60°±2° C. should be maintained over a period of 24 hours to form the 2-chloro-4-(1,1,3,3-tetramethylbutyl)-6-methylol-phenol.

The 2-chloro - 4-(1,1,3,3-tetramethylbutyl)-6-methylol-phenol may be diluted with kerosene and added directly to the loading section of the extraction plant. However, for storage it is recommended that the product be cooled to 30° C., neutralized with 17 pounds of 2 molar sulfuric acid, and diluted with kerosene to reduce the viscosity.

The term "polyol" has been used throughout this specification and in the claims appended hereto; the term is to be interpreted as including the diols also, most of the preferred extractants being diols.

Obviously, many modifications and variations may be made without departing from the spirit and scope of this invention, and therefore only such limitations should be imposed as are indicated in the appended claims.

This application is a continuation-in-part of our application Serial No. 834,507 filed August 18, 1959, now abandoned, for Boron Extractants.

We claim:

1. The process which comprises contacting an aqueous alkaline medium containing boron and alkali values with a homocyclic aromatic polyol, to form a complex of said boron and alkali with said polyol, said polyol containing less than 15 annular carbon atoms.

2. The process which comprises contacting an aqueous alkaline medium containing boron and alkali values with a homocyclic aromatic polyol, to form a complex of said boron and alkali with said polyol, said polyol containing less than 15 annular carbon atoms and having —OH and —CH(R)OH substituents bonded to adjacent annular carbon atoms, said R being selected from the group consisting of hydrogen, alkyl groups having one to seven carbon atoms and halo-substituted alkyl groups having one to seven carbon atoms.

3. The process which comprises contacting an aqueous alkaline medium containing boron and alkali values with a homocyclic aromatic polyol to form a complex of said boron and alkali with said polyol, said polyol containing less than 15 annular carbon atoms and having two —OH substituents bonded to annular carbon atoms.

4. The process which comprises contacting an aqueous alkaline medium containing boron and alkali values with a homocyclic aromatic polyol to form a complex of said boron and alkali with said polyol, said polyol containing less than 15 annular carbon atoms and having one —C(H)OHC($H_2$)OH substituent bonded to one annular carbon atom.

5. The process which comprises contacting an aqueous alkaline medium containing boron and alkali values with a homocyclic aromatic polyol to form a complex of said boron and alkali with said polyol, said polyol containing less than 15 annular carbon atoms and having one —O—$CH_2$—CHOH—$CH_2$OH substituent bonded to one annular carbon atom.

6. The process which comprises contacting an aqueous alkaline medium containing boron and alkali values with a homocyclic aromatic polyol to form a complex of said boron and alkali with said polyol; and separating said complex from said aqueous medium, said polyol containing less than 15 annular carbon atoms.

7. The process which comprises contacting an aqueous alkaline medium containing boron and alkali values with a homocyclic aromatic polyol to form a complex of said boron and alkali with said polyol; and separating said complex from said aqueous medium; and separating said boron values from said complex by contacting said complex with a second aqueous medium to cause the release of said boron from said polyol into said second aqueous medium, said polyol containing less than 15 annular carbon atoms.

8. The process which comprises contacting an aqueous alkaline medium containing boron and alkali values with a homocyclic aromatic polyol to form a complex of said boron and alkali with said polyol; and separating said complex from said aqueous medium; contacting said complex with a second aqueous medium; acidifying said second aqueous medium with a dilute mineral acid to cause the release of said boron from said polyol, said polyol containing less than 15 annular carbon atoms.

9. The process which comprises contacting an aqueous alkaline medium containing boron and alkali values with a homocyclic aromatic polyol to form a complex of said boron and alkali with said polyol; and separating said complex from said aqueous medium; and separating said boron values from said complex by contacting said complex with a second aqueous medium to cause the release of said boron from said polyol into said second aqueous medium; stripping said polyol from said second aqueous medium by contacting said second aqueous medium with a substantially water-immiscible organic liquid which is a solvent for said polyol, said polyol containing less than 15 annular carbon atoms.

10. The process which comprises contacting an aqueous alkaline medium containing boron and alkali values with a substantially, water-immiscible organic liquid, said organic liquid containing a substantially water-insoluble homocyclic aromatic polyol to form a substantially water-insoluble complex of boron and alkali with said polyol in said organic liquid, said polyol containing less than 15 annular carbon atoms.

11. The process which comprises contacting an aqueous alkaline medium containing boron and alkali values with a substantially, water-immiscible organic liquid, said organic liquid containing a substantially water-insoluble homocyclic aromatic polyol to form a substantially water-insoluble complex of boron and alkali with said polyol in said organic liquid; separating said complex containing organic liquid from said aqueous medium; contacting said complex containing organic liquid with a second aqueous medium; acidifying said second aqueous medium with a dilute mineral acid to cause the release of said boron from said polyol and the transfer of said boron from said organic liquid to said second aqueous medium, said polyol containing less than 15 annular carbon atoms.

12. The process which comprises contacting an aqueous alkaline medium containing boron and alkali values with a substantially, water-immiscible organic liquid, said organic liquid containing a substantially water-insoluble homocyclic aromatic polyol to form a substantially water-insoluble complex of boron and alkali with said polyol in said organic liquid; said polyol containing less than 15 annular carbon atoms; said organic liquid being selected from the group consisting of petroleum ether, benzene, isopropyl ether, diethylether and organophosphate, kerosene and a monohydric alcohol having between 8 and 17 carbon atoms.

13. The process which comprises contacting an aqueous alkaline medium containing boron and alkali values with the homocyclic aromatic polyol, 2-chloro-4-(1,1,3,3-tetramethylbutyl)-6-methylolphenol to form a complex of boron and alkali with said polyol.

14. The process which comprises contacting an aqueous alkaline medium containing boron and alkali values with the homocyclic aromatic polyol, 2-chloro-4-nonyl-6-methylolphenol; to form a complex of boron and alkali with said polyol.

15. The process which comprises contacting an aqueous alkaline medium containing boron and alkali values with the homocyclic aromatic polyol, 2,3-naphthalenediol; to form a complex of boron and alkali with said polyol.

16. The process which comprises contacting an aqueous alkaline medium containing boron and alkali values with the homocyclic aromatic polyol, 1,8-naphthalenediol; to form a complex of boron and alkali with said polyol.

17. The process which comprises contacting an aqueous alkaline medium containing boron and alkali values with the homocyclic aromatic polyol, 1,10-anthracenediol; to form a complex of boron and alkali with said polyol.

References Cited in the file of this patent

UNITED STATES PATENTS

| | | |
|---|---|---|
| 2,795,548 | Thomas et al. | June 11, 1957 |
| 2,877,092 | Reas | Mar. 10, 1959 |
| 2,894,020 | McManimie | July 8, 1959 |
| 2,902,450 | Lowe | Sept. 1, 1959 |
| 2,969,275 | Garret | Jan. 24, 1961 |